United States Patent
Parker

(10) Patent No.: US 8,509,814 B1
(45) Date of Patent: Aug. 13, 2013

(54) METHOD AND SYSTEM FOR INTEGRATING LOCATION BASED SERVICES INTO RETAIL APPLICATIONS

(75) Inventor: Benjamin J. Parker, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1481 days.

(21) Appl. No.: 10/807,684

(22) Filed: Mar. 24, 2004

(51) Int. Cl.
  *H04W 24/00* (2009.01)
  *H04M 3/42* (2006.01)
(52) U.S. Cl.
  USPC .................................. 455/456.3; 455/414.2
(58) Field of Classification Search
  USPC ............. 455/456.3, 422.1, 440, 456.1, 456.2, 455/456.5, 456.6, 403, 414.1–414.4; 705/14.1–14.73
  See application file for complete search history.

(56) References Cited

U.S. PATENT DOCUMENTS

| | | | |
|---|---|---|---|
| 6,396,537 B1 | 5/2002 | Squilla et al. | |
| 6,912,398 B1 | 6/2005 | Domnitz | |
| 6,944,447 B2 * | 9/2005 | Portman et al. | 455/422.1 |
| 6,961,555 B1 * | 11/2005 | Philyaw | 455/403 |
| 7,035,647 B2 * | 4/2006 | de Verteuil | 455/456.1 |
| 7,076,244 B2 * | 7/2006 | Lazaridis et al. | 455/414.2 |
| 7,096,030 B2 * | 8/2006 | Huomo | 455/456.3 |
| 7,369,864 B2 * | 5/2008 | Vaananen | 455/466 |
| 7,386,318 B2 * | 6/2008 | Moon et al. | 455/456.3 |
| 7,558,584 B2 * | 7/2009 | Yamamoto et al. | 455/456.5 |
| 2001/0018349 A1 * | 8/2001 | Kinnunen et al. | 455/456 |
| 2002/0123359 A1 * | 9/2002 | Wei et al. | 455/466 |
| 2002/0155844 A1 * | 10/2002 | Rankin et al. | 455/456 |
| 2002/0160759 A1 * | 10/2002 | Pradhan et al. | 455/414 |
| 2002/0183046 A1 * | 12/2002 | Joyce et al. | 455/414 |
| 2004/0203909 A1 * | 10/2004 | Koster | 455/456.1 |
| 2005/0070262 A1 * | 3/2005 | Weigand | 455/418 |

OTHER PUBLICATIONS

Kölmel, B., Alexakis, S., "Location Based Advertising," M-Business 2002, The First International Conference on Mobile Business.

* cited by examiner

*Primary Examiner* — George Eng
*Assistant Examiner* — Nam Huynh

(57) ABSTRACT

A method and system for integrating location based services into retail applications. Correlation-data and request-trigger logic are stored in data storage of a portable device. The correlation-data defines geographic locations and corresponding network addresses. The portable device determines its geographic location (i.e. by using a GPS receiver device). In response to determining its location, the portable device uses the request-trigger logic to determine if its present location is within a geographic area defined in the correlation-data. When the request-trigger logic finds that the location is within a defined area, the portable device responsively sends an information-request to a network address pre-correlated with the given location. In response to the information-request, the portable device receives merchant-information (i.e. coupons, special offers, etc.) from a merchant-server. The portable device displays the merchant information for viewing by a user. Advantageously, the invention can help avoid having merchants "spam" the device with unwanted information.

32 Claims, 7 Drawing Sheets

METHOD AND SYSTEM FOR INTEGRATING LOCATION BASED SERVICES INTO RETAIL APPLICATIONS

BACKGROUND

1. Field of the Invention

The present invention relates to location based wireless services and, more particularly, to a delivery system and method for providing location-based merchant information to portable devices.

2. Description of Related Art

Given the widespread popularity of wireless communications and the availability of location-determining technologies, it is now possible for merchants to deliver advertisements to portable devices that happen to be located in a particular geographic area at a particular time. Merchants can use this capability to enhance the effectiveness of their marketing efforts by targeting consumers who are carrying portable devices in a particular area where advertisements might be particularly effective, such as near a merchant's storefront. In practice, for instance, a merchant would interact with a wireless carrier to determine when a portable device is located near the merchant, and the merchant would then send an advertisement or coupon to the portable device, as an SMS message for instance.

Unfortunately, however, this process can result in delivery of unwanted "junk mail" or "spam" to portable devices. For instance, as a portable device passes by multiple stores, the stores could bombard the portable device with advertisements seeking the consumer's business. Such advertisements could be an annoyance to the user of the portable device, as the user may prefer to receive advertisements from only certain types of merchants or, alternatively, from no merchants. Therefore, there is a need for a portable device that can determine when it is in a location where it would make sense for the device to receive location-based information such as advertisements or coupons, and responsively request such information.

SUMMARY

The present invention provides an improved method and system for providing location-based merchant information to portable devices wherein the device itself can determine when it is in a location where it would make sense to receive such information. According to an exemplary embodiment of the invention, a portable device is provided that has a network communication interface, a processing unit, and data storage with correlation-data and trigger-logic stored therein. The correlation-data stored in the data storage defines a plurality of geographic locations with a corresponding network address for each location. The trigger logic that is stored in the data storage is executable by the processing unit to monitor the geographic location of the portable device, to determine when the geographic location of the portable device matches a geographic location defined by the correlation-data, and if a match is found, to initiate a process of requesting information from the corresponding network address via the network communication interface.

By way of example, a portable device (i.e. a cellular telephone) could monitor its geographic location and determine when its current geographic location matches a geographic location defined in the correlation-data. For instance, the portable device may periodically employ a GPS receiver to determine its location, and/or the device may periodically query a radio access network to obtain a reading of the device's geographic location. When the portable device determines that its geographic location matches a geographic location defined by the correlation-data, the device could initiate a process of requesting information from the corresponding network address. For instance, the device may prompt a user for permission to send an information-request to the network address and, upon receipt of user approval, send the information-request. Alternatively, the device may simply go ahead and send the information-request. Sending this information-request may include sending a Hypertext Transfer Protocol (HTTP) request to the network address. A merchant server at the network address will then deliver information to the portable device in response to the information-request. Upon receiving the information delivered to it by the merchant server, the portable device might interpret and display the information for viewing by a user.

The information that the merchant server provides can be merchant information, sight-seeing information, or other sorts of information, preferably related to the device's current location in some manner. Additionally, the information delivered to the portable device by the merchant server can take various forms but preferably comprises a merchant-interface through which a user of the device can interface with the merchant. For instance, the merchant-interface could define a merchant-coupon that a user of the device can redeem for discounts on goods or services, and the merchant-interface could also define redemption-logic that a user of the device can invoke in order to generate and send a coupon-redemption request to the merchant. Further, the merchant could tailor the merchant-interface based on an identity of the requesting device or user.

Advantageously, by having the device itself determine when it is located in a given location and then request information from a network address corresponding to that location, the invention can help avoid having merchants "spam" the device with unwanted information. Ideally, a user of the device could establish the correlation-data in advance, so as to set the device to request information only when the device is at specific geographic locations designated by the user.

Additionally, a merchant can benefit from this invention by learning when an interested customer happens to be nearby or in the merchant's store. If the user provisions the device in advance with correlation-data reflecting locations of importance to the user (e.g., stores that the user likes to visit), in response to an information-request, the merchant-server could generate and send a notification to such merchants that such a customer is in or near the merchant's place of business. The merchant might want to use this information to cater to that user as an interested customer. For instance, in response to the information-request made by a user's device, a merchant could have a sales person personally greet or otherwise assist the user as the user enters or browses through the merchant's store. Other examples are possible as well.

These and other aspects and advantages of the present invention will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
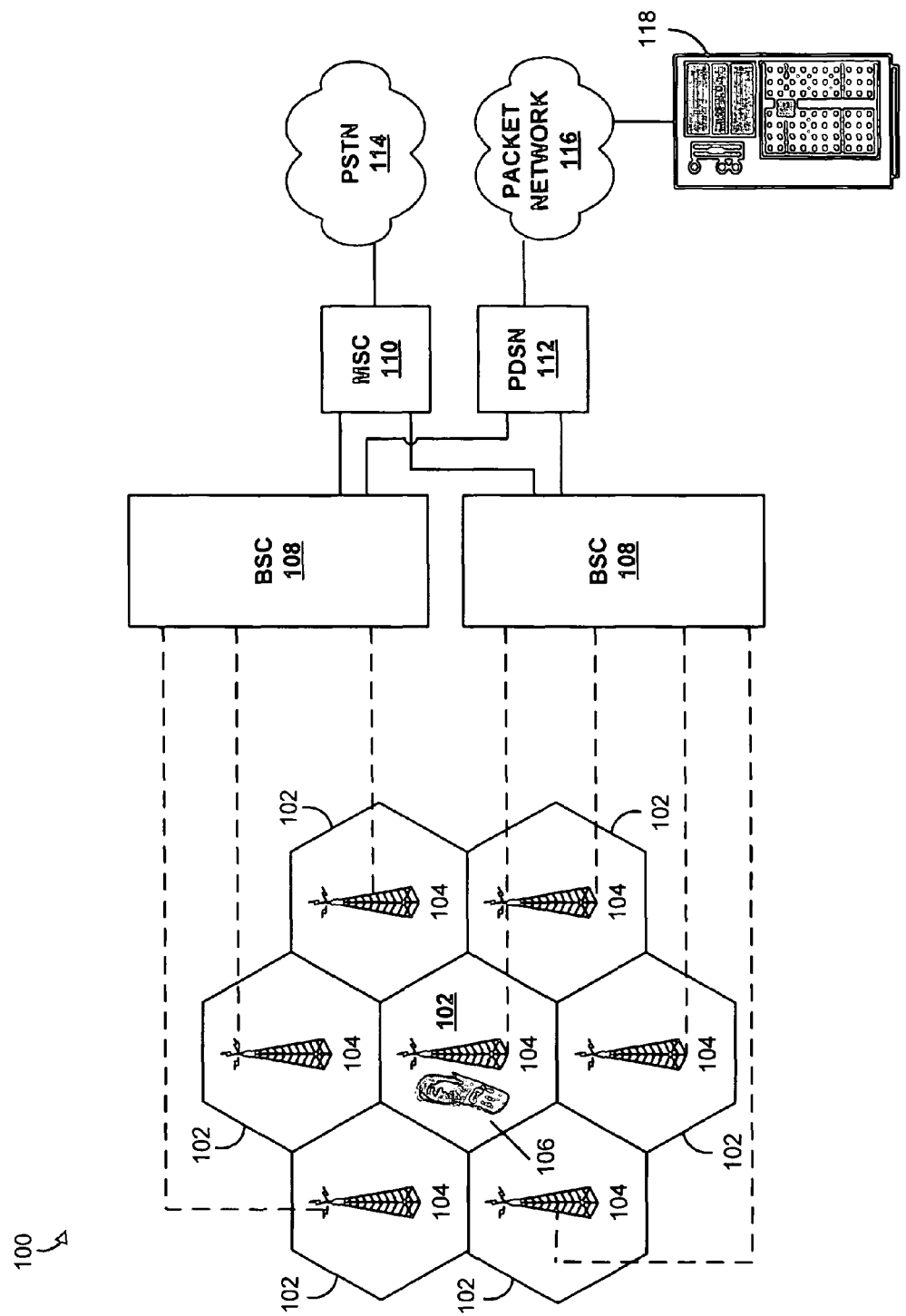
FIG. 1 is a block diagram illustrating components of an exemplary cellular radio communications system.

Referring to the drawings, FIG. 1 is a block diagram illustrating components of a cellular radio communications system (wireless network) 100. In a typical wireless network 100, an area is divided geographically into a number of cell sites 102. Each cell 102 can by defined by a radio frequency (RF) radiation pattern from a respective base transceiver station (BTS) 104 antenna, and each cell 102 can include one or more sectors (not shown for clarity). Each BTS 104 typically can transmit and receive wireless communications to and from a plurality of portable devices 106, illustrated in FIG. 1 as a cellular telephone. Other types of portable devices are possible as well.

Each BTS 104 might connect to a base station controller (BSC) 108. As its name suggests, the BSC 108 can function to control communications via one or more BTSs 104. For instance, in some arrangements, a BSC 108 might control the power level of wireless signals emitted by a BTS 104 and might control the handoff of communications as a portable device 106 moves between sectors within a BTS coverage area.

Each BSC 108 might then be coupled to a telecommunications switch or gateway, such as a mobile switching center (MSC) 110 and/or a packet data serving node (PDSN) 112, for instance. The MSC 110 might be coupled to one or more networks, such as the public switched telephone network (PTSN) 114, and manage voice sessions established by the portable devices 106. The PDSN 112 might be coupled to one or more data networks, such as a packet data network 116, and manage packet data sessions established by the portable devices 106. Additionally, the packet data network 116 might have at least one merchant server 118 connected to it in order to provide the portable device 106 with access to the merchant server 118.

When a user positions a portable device 106 in a cell 102, the portable device 106 might communicate via an RF air interface with the BTS 104 of the cell 102. Consequently, a communication path can be established between the portable device 106 and the network 100, via the air interface, the BTS 104, the BSC 108, and the switch or gateway (MSC 110 or PDSN 112, for example).

A portable device 106 might communicate with the BTS 104 using any of a variety of different protocols. For instance, in a TDMA system, each BTS 104 typically communicates on a group of frequencies, and each frequency may itself carry at least one multiplexed call or data session. In a CDMA system, by comparison, each BTS 104 communicates over a spread spectrum of frequencies, and the spectrum may carry many multiplexed calls and/or data sessions. Typical components for CDMA systems include those described in the CDMA2000 standard, 3GPP2 C.S0001-C, dated May 28, 2002, which is incorporated herein by reference in its entirety. The Global System for Mobile Communications (GSM) or other methods may also be used.

Figure 2:
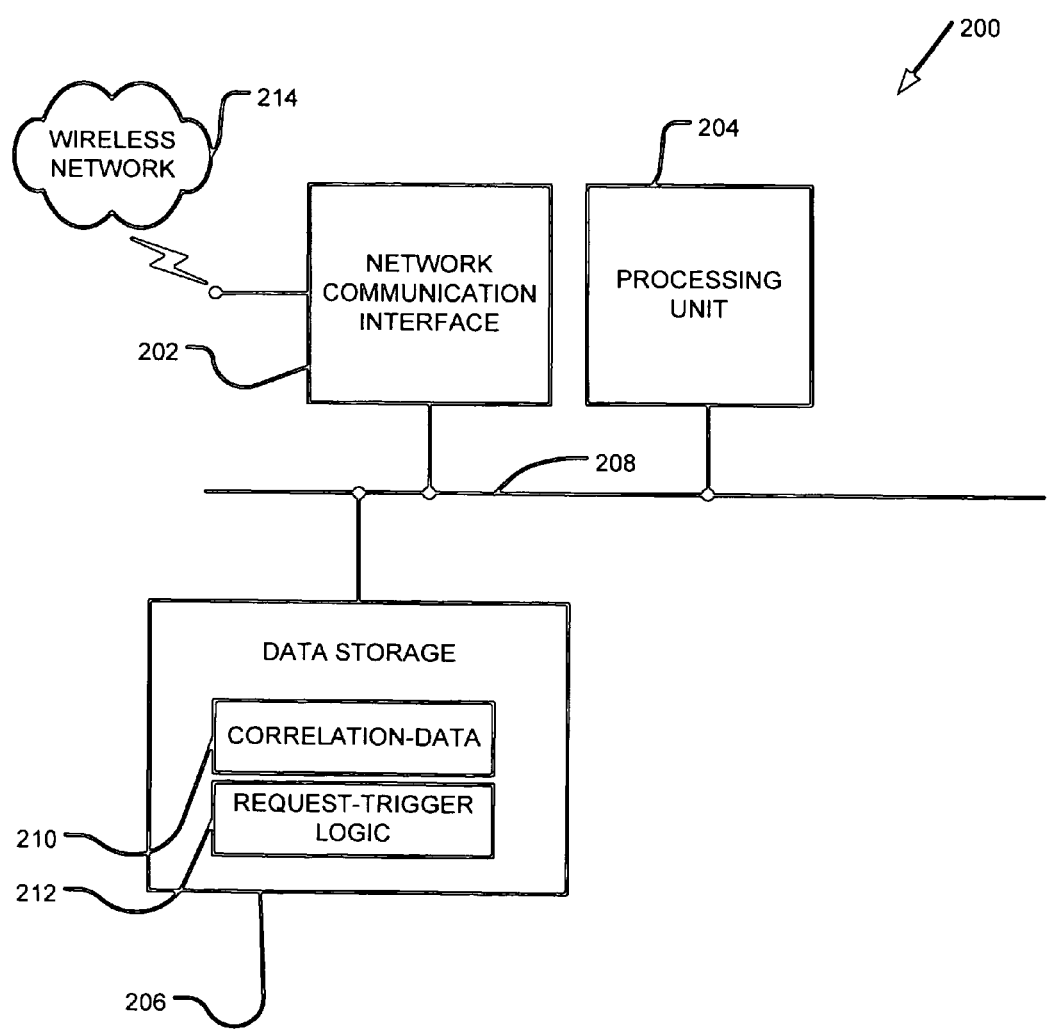
FIG. 2 is a block diagram illustrating a portable device that may be used in accordance with the exemplary embodiment.

FIG. 2 is a block diagram of a portable device 200 in accordance with an exemplary embodiment of the present invention. As illustrated, the portable device 200 may include a network communication interface 202, a processing unit 204, and data storage 206, all coupled to at least one bus, illustrated as a bus 208. In an exemplary embodiment, the data storage 206 may store data, including correlation-data 210, and computer instructions, including request-trigger logic 212, executable by the processing unit 204. The portable device 200 could be many different types of devices, including a cellular telephone, a portable computer, or a personal digital assistant (PDA). Other types of devices are also possible.

The stored correlation-data 210 can define a plurality of geographic areas, and for each geographic location, a corresponding network address. For instance, referring to Table 1,

TABLE 1

| First Longitude | Second Longitude | First Latitude | Second Latitude | Network Address | Location Name |
|---|---|---|---|---|---|
| A | B | C | D | xxx.xxx.xxx.xxx | Shopping Area A |
| E | F | G | H | yxx.xxx.xxx.xxx | Mall Z |
| I | J | K | L | zxx.xxx.xxx.xxx | Shopping Area B | the correlation-data 210 may be contained in a table having a first column containing first longitude coordinates, a second column containing second longitude coordinates, a third column containing first latitude coordinates, and a fourth column containing second latitude coordinates. The first and second longitude coordinates and the first and second latitude coordinates could define a geographic area having the longitude and latitude coordinates listed in one of the rows of the table as its boundaries. Additionally, the table may have a fifth column containing a network addresses corresponding to the geographic areas defined by the stored coordinates. The network address could be an Internet protocol (IP) address, or a uniform resource identifier (URI), such as a uniform resource locater (URL). Other types of network address identifiers could also be used. A sixth column containing corresponding geographic location name information (e.g. Shopping Area A) that the portable device 200 could use to inform the user of current location in terms readily understandable by the user is also possible, as are other columns containing additional information.

Turning back to FIG. 2, the request-trigger logic 212 may contain instructions for monitoring the geographic location of the portable device 200, for determining when the location of the portable device 200 is within a geographic area defined by the correlation-data 210, and for initializing a process of requesting information from the corresponding network address via the network communication interface 202, in response to the determination. The network communication interface 202 could be used to connect the device 200 with a merchant server, for instance, via a wired or wireless network 214, depending on the type of device (FIG. 2 illustrates a wireless configuration). A wireless network communication interface 202 would include a suitable antenna and transceiver circuitry (e.g. a Qualcomm™ MSM Series chipset) to facilitate communication over an air interface with a wireless network 214. Standard air interface protocols such as CDMA, GSM, or TDMA, as well as others, could be used. Other arrangements are possible as well.

Figure 3:
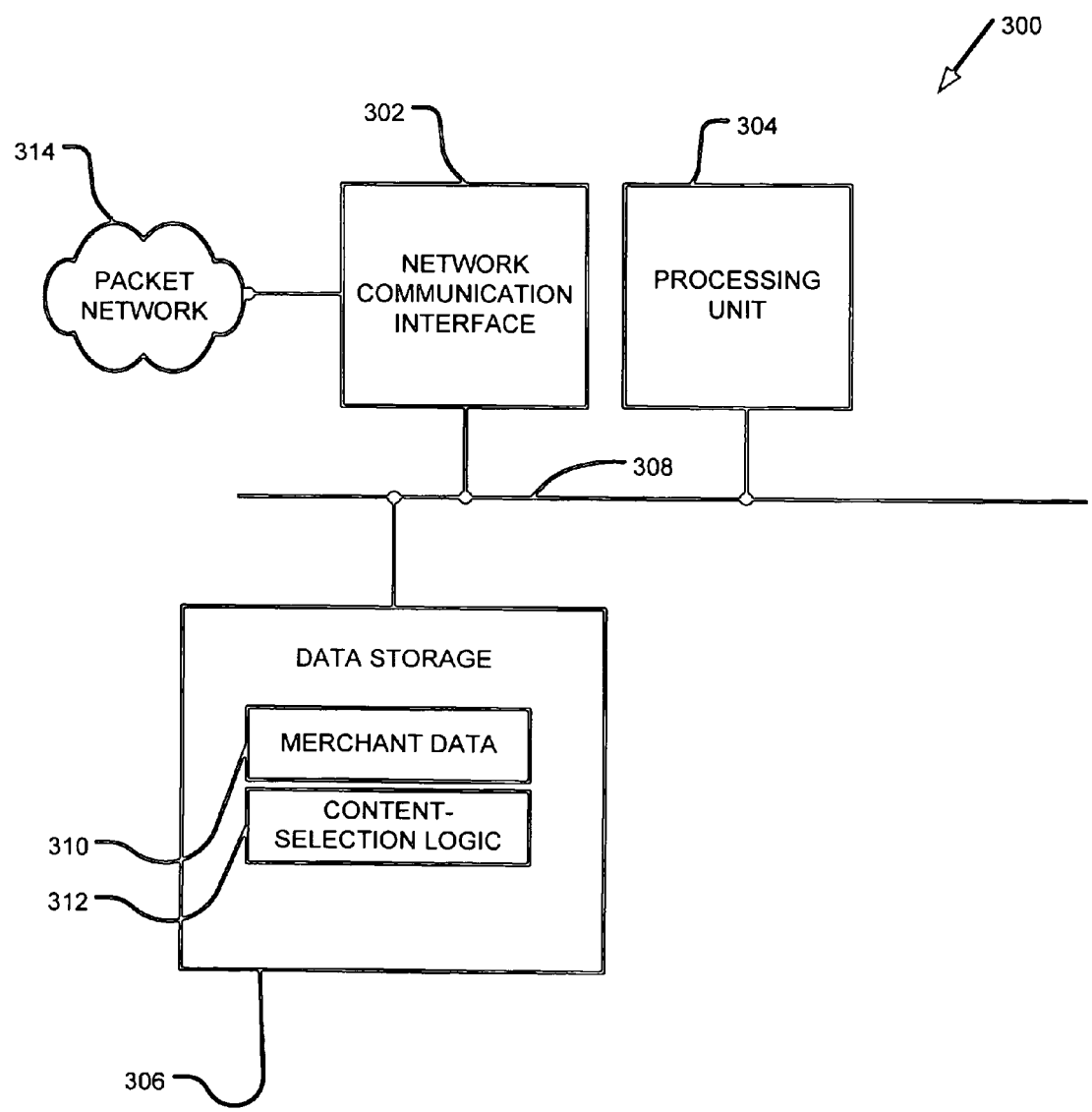
FIG. 3 is a block diagram illustrating a merchant server that may be used in accordance with the exemplary embodiment.

FIG. 3 is a block diagram of a merchant server 300 in accordance with an exemplary embodiment of the present invention. As illustrated, the merchant server 300 may include a network communication interface 302, a processing unit 304, and data storage 306, all coupled to at least one bus, illustrated as a bus 308. In an exemplary embodiment, the data storage 306 may store data, including merchant data 310, and computer instructions, including content-selection logic 312, executable by the processing unit 304. Additionally, the merchant server 300 might be accessible over a network 314 (e.g. a packet network) via the network communication interface 302.

The stored merchant data 310 can define a plurality of merchant advertisements, offers, and coupons, for instance, corresponding to various merchants, as well as a merchant interface that allows a user to interact with the merchant. A markup language, such as Hypertext Markup Language (HTML) or Handheld Device Markup Language (HDML), could define the merchant data 310. The stored content-selection logic 312 may contain instructions for determining what advertisements, offers, or coupons to send to a user.

Figure 4:
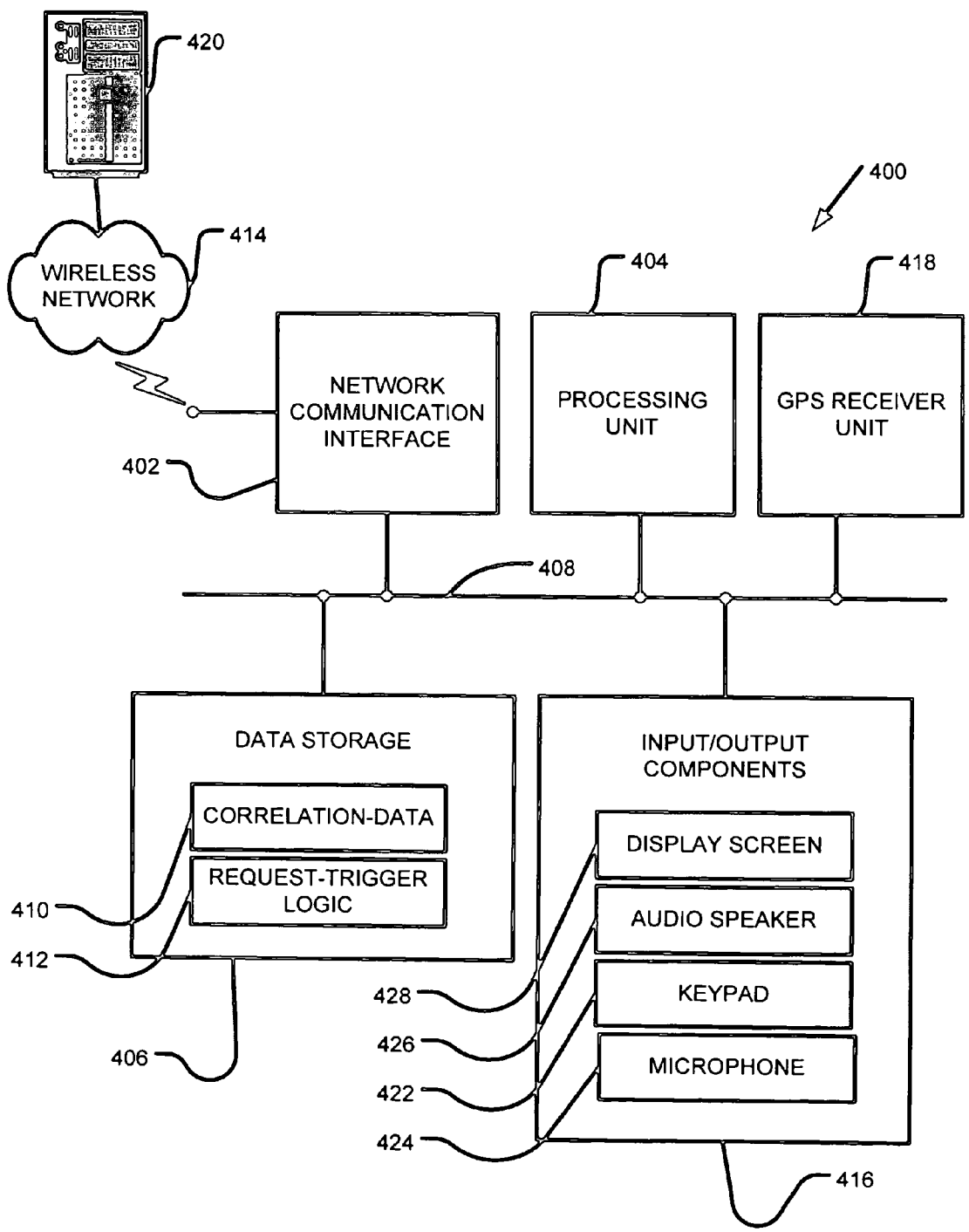
FIG. 4 is a block diagram illustrating a portable device that may be used in accordance with the exemplary embodiment.

FIG. 4 is another block diagram of the portable device 200 of FIG. 2, showing input/output components 416 (i.e. a user interface), and a GPS satellite positioning receiver unit 418, both attached to the bus 408. Additionally, a merchant server 420 is shown connected to the wireless network 414. The input/output components 418 of the portable device 400 can facilitate interaction with a user of the portable device 400. As such, the input/output components 418 might include as input mechanisms, a keypad 422 and/or a microphone 424, and as output mechanisms, an audio speaker 426 and/or a display screen 428, for instance. The portable device 400 might also comprise other or additional input and/or output components, or fewer input and/or output components than shown in FIG. 4.

The GPS receiver unit 418 shown in FIG. 4 can be used to determine the geographic location of the portable device 400, however, the portable device 400 could alternatively employ other types of satellite-positioning technologies. The GPS receiver 418 could be a GPS 1™ receiver manufactured by Qualcomm™, for instance. The GPS receiver 418 typically determines its geographic location by measuring the arrival time of at least three concurrently received wireless signals transmitted from a constellation of GPS satellites. The GPS receiver 418 then translates the measured arrival times into longitude and latitude coordinates and outputs its determined location over the bus 408. Although longitude and latitude coordinates typically define the location of the portable device 400, other arrangements are possible.

Figure 5:
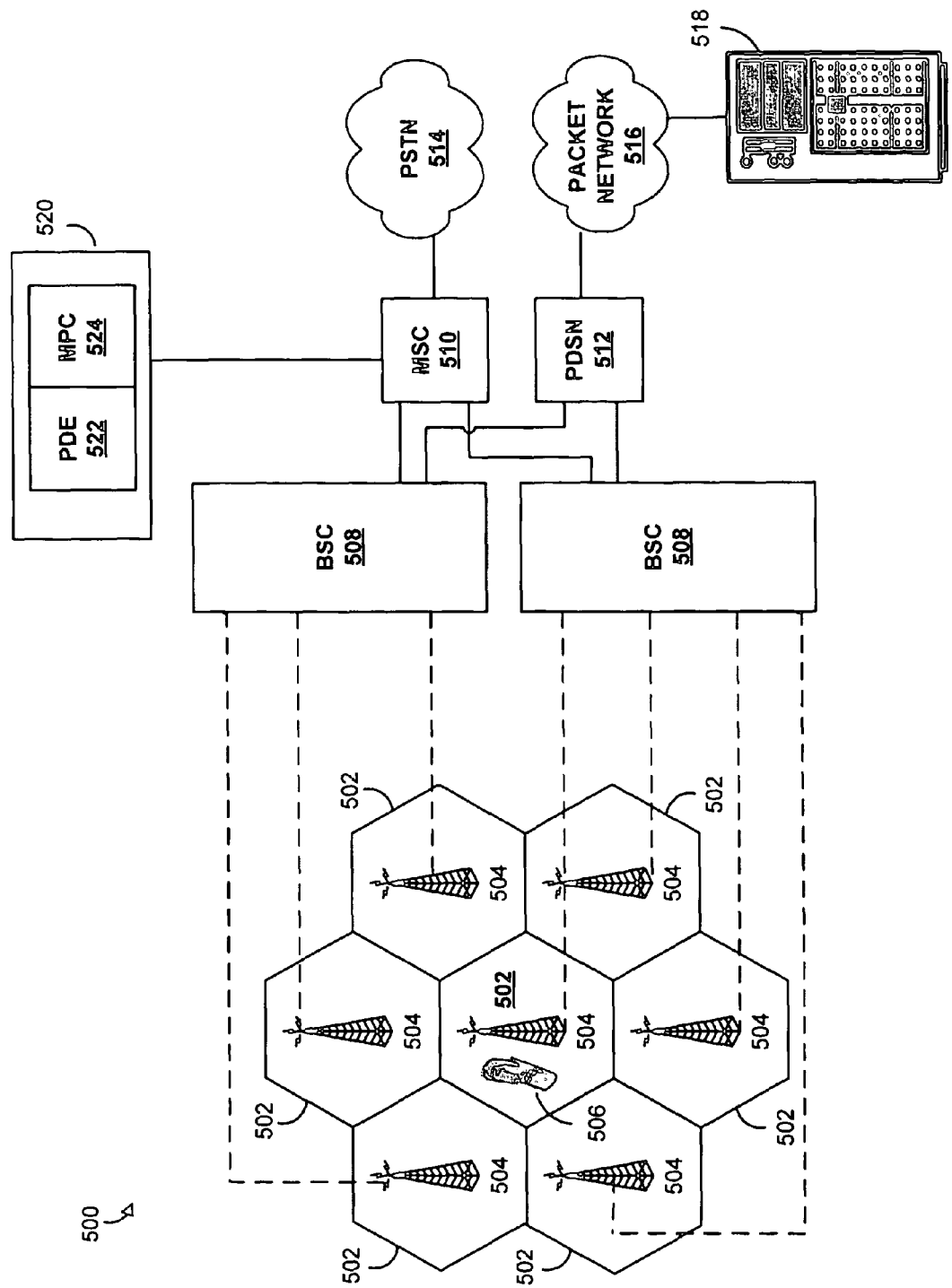
FIG. 5 is a block diagram illustrating a cellular radio communications system having exemplary positioning determining components.

As an alternative, or in addition, to employing a satellite-positioning technology, such as GPS, the portable device 400 could have a position determination module comprising logic to enable the portable device 400 to query the wireless network 100 to determine its geographic location. FIG. 5 is another block diagram of the wireless network of FIG. 1 further depicting an exemplary network location system 520 having position determining components that the network might use to provide the portable device 506 with its geographic location in the wireless network 500. In an exemplary embodiment, the network location system 520 can determine the location of the portable device 506, and, in response to a request from the portable device 506, report to the portable device 506 its location. As such, the location system 520 and position determining components could take a variety of forms. For example, the position determining components might include position determining equipment (PDE) 522 and a mobile positioning center (MPC) 524 as defined by J-STD-036.

The PDE 522 can be any system for determining the location of one or more portable devices 506. As an example, the PDE 522 might comprise a network-based location determination system, such as a home location register (HLR) that can maintain a record of the cell 502 and sector (not shown for clarity) in which each portable device 506 in communication with the wireless network 500 is operating. As another example, the PDE 522 might comprise a triangulation system that can determine the geographic location of the portable device 506 based on a comparison of relative signal strengths transmitted by the portable device 506 measured by at least three separate BTSs 504. Alternatively, or additionally, the PDE 522 might comprise a portable device 506 having a GPS receiver 420, capable of determining its location using satellite signals, as discussed above, as well as functionality to communicate that location information from the portable device 506 to the network (e.g. using SMS and location messaging defined by IS-801). In another embodiment, the PDE 522 might be integrated with one or more BTSs 504 of the wireless network 500 and might also include other radio-frequency processing or collating devices for providing the geographic coordinates of the portable device 506 to the MPC 524. Other examples are also possible. Additional methods for measuring position might also include a time difference of arrival ("TDOA") method or an angle of arrival ("AOA") method. Other examples are possible as well.

In an exemplary embodiment, location coordinates of longitude and latitude can identify the location of the portable device 506. The PDE 522 might update the location of the portable device once a user changes the location of the portable device 506, or the PDE 522 might update the location of the portable device 506 only in response to the portable device 506 querying the wireless network 500 for the location of the portable device 506. Other examples are possible as well.

The MPC 524 can generally be a database application executed on a service control point and can function to store the location of one or more portable devices 506. In an exemplary embodiment, the MPC 524 can maintain a record of the location of the portable device 506, as determined by the PDE 522. In an exemplary embodiment, the MPC 524 might communicate with other entities of the wireless network 500, such as the MSC 510. In turn, the portable device 506 can query the MPC 524 to determine its location, and the MPC 524 can report the requested location to the device 506 via the wireless network 500.

In an exemplary embodiment, the MSC 510 might receive from the portable device 506 a request for the portable device's geographic location. The MSC 510 might then transmit that request to the MPC 524, which might then process that request, and provide the geographic location of the portable device 506 to the MSC 510 for forwarding to the requesting portable device 506 via the wireless network 500. Any of the above described methods for determining the geographic location of the portable device 506 might be combined with at least one other such method in an attempt to improve the accuracy with which the network can determine the geographic location of the device 506.

2. Exemplary Operation

Figure 6:
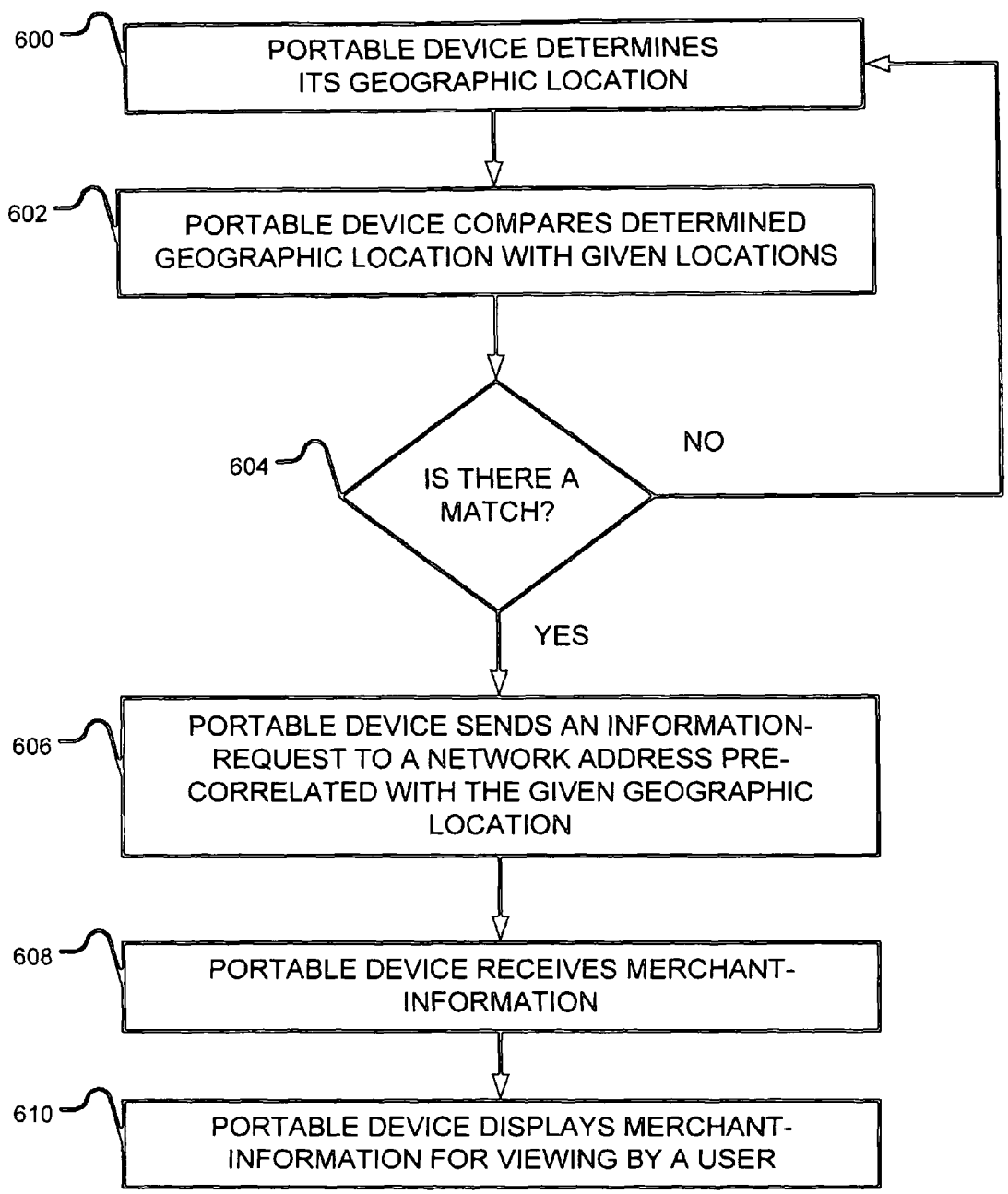
FIG. 6 is a flowchart illustrating a functional process flow in accordance with the exemplary embodiment.

FIG. 6 is a flow chart that illustrates exemplary functions performed by the portable device 400 in accordance with an exemplary embodiment of the present invention. At step 600, the portable device 400 determines its geographic location. The portable device 400 could determine its geographic location by utilizing a satellite-positioning receiver, such as a GPS receiver 420 and/or by querying a radio access network 416 via the network communication interface 402 to obtain a reading of the device's geographic location, as discussed above. Other methods are possible as well. Additionally, the request-trigger logic 412 can be applied to monitor the geographic location of the portable device 400 by automatically and periodically employing one of the above methods for determining the geographic location of the device, or by employing one of the above methods only when directed to do so by a user.

After the portable device 400 determines its location, the processing unit 404 executes the request-trigger logic 412 at step 602 to compare the actual geographic location of the portable device 400 with the geographic areas defined by the correlation-data 410. The request-trigger logic 412 can do this by searching the ranges of geographic longitude and latitude coordinates stored in the first, second, third, and fourth columns of the table of correlation-data 300 (see Table 1), for instance. If the request-trigger logic 412 does not find a row in the correlation-data table having a range of longitude and latitude coordinates that contains the current longitude and latitude coordinates of the portable device 400 at step 604, the process starts over at step 600. However, if the request-trigger logic 412 does find a row with a range of longitude and latitude coordinates containing the location of the portable device 400, it causes the portable device 400, at step 606, to initiate a process of requesting information from the corresponding network address via the network communication interface 402.

The device could make the information request via the network interface 402 by using an HTTP GET request, for instance. By way of example, the processing unit 404 of the portable device 400 might cause the portable device 400 to prompt a user for permission to send an information-request to the network address, and send the information-request only upon receipt of user approval. Alternatively, the device 400 may simply go ahead and automatically send the information-request in response to a determination at step 604 that a geographic location match exists.

The information-request could also define a requestor-identity comprising information about the user, and could provide this information to the merchant server 300. The user could provision this requestor-identity in the portable device 400, via the keypad 422, by entering information such as age, sex, interests, and stores that the user frequents, for instance, and by storing the entered requestor-identity in data storage 406.

The merchant server 300 could use the content-selection logic 312, along with the information contained in the requestor-identity, to tailor the merchant-information delivered to a particular user's portable device 400. The capability of the merchant server 300 to tailor the merchant information sent to the portable device 400 based on the requestor-identity could allow merchants to provide specific advertisements, offers, and coupons to users meeting certain criteria (e.g. age, sex, etc.), while providing other merchant information to users meeting other criteria or having no user-identity. By way of example, if the requestor-identity comprises information that the requestor is 65 years old, the merchant server could provide the user with offers that might be of particular interest to a 65 year old.

Additionally, in response to receiving an information-request, from a portable device 400, the merchant server 300 could generate and transmit a notification to be delivered to a store indicating that the user is located at a particular location (e.g. in the store). A store that receives notification that the user is located in a particular area might want personally greet or otherwise assist the user. Additionally, if the information-request comprises information regarding stores that the user of the portable device 400 frequents, and if the notification from the merchant server 300 reflects that information, upon receiving the notification, the merchant might want to cater to the user as an interested customer. Other examples are possible as well.

In response to the information-request, a merchant server 300 at the corresponding network address will deliver information to the portable device 400, which will receive the information at step 608. The information that the portable device 400 receives from the merchant server 300 could take various forms (i.e. advertisements, coupons, etc.), but preferably comprises a merchant-interface that can be displayed by the portable device 400, at step 610. The information could define the merchant interface in a markup language such as HTML or HDML, for instance, and the portable device 400 could include an interpreter for interpreting the markup-language. This interpreter could comprise a browser (e.g. a micro-browser), for instance, stored in data storage 406, and the portable device 400 could then display the merchant interface to the user on the display screen 428 via the browser.

The user could then use the displayed merchant interface to interact with a merchant. For instance, the merchant-interface could display a merchant-coupon that a user of the device 400 can redeem for discounts on goods or services, and the merchant-interface could also define redemption-logic that a user of the device 400 can invoke, by pressing a keypad button 422 on the portable device 400, for instance, in order to generate and send a coupon-redemption request to the merchant via the wireless network.

Figure 7:
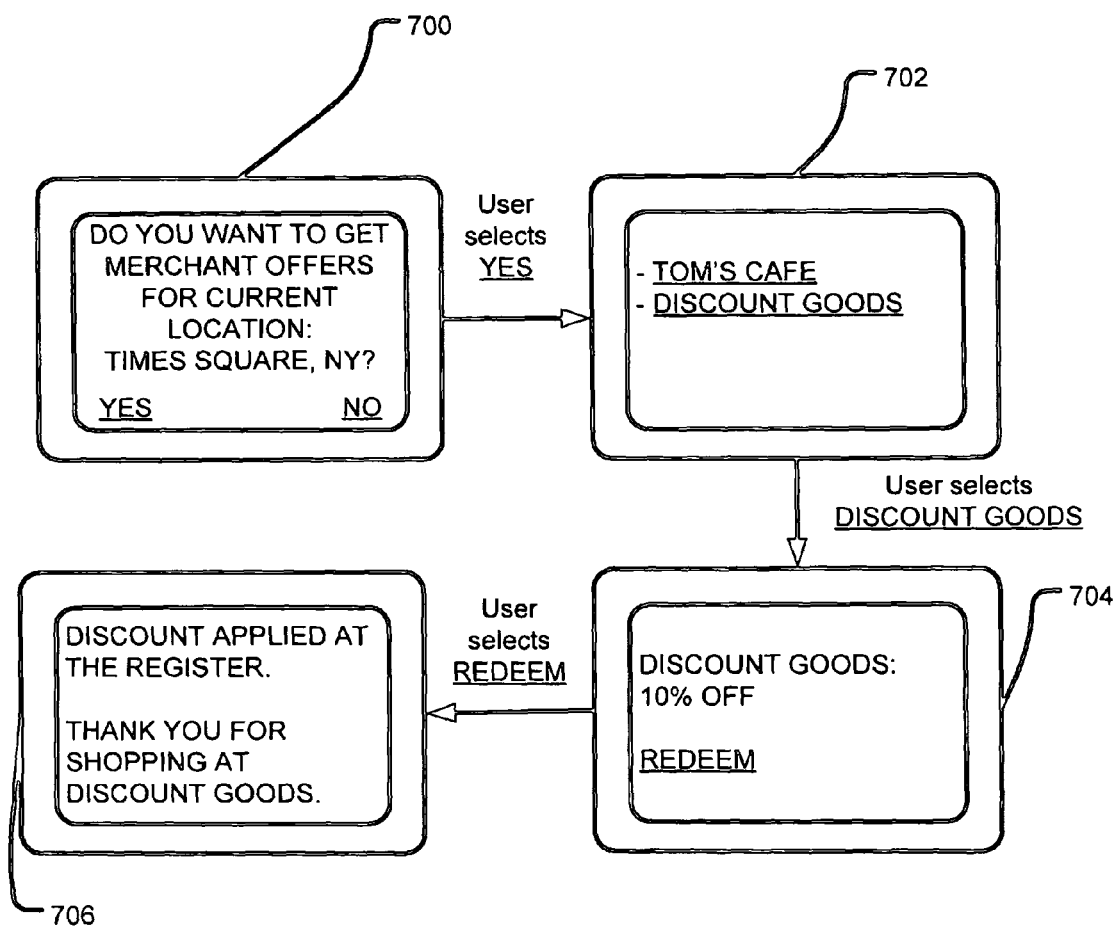
FIG. 7 is a block diagram illustrating a merchant interface that may be used in accordance with the exemplary embodiment.

FIG. 7 illustrates an exemplary merchant interface displayed on the portable device 400. When a user carrying the portable device 400 enters a geographic area defined by the correlation-data 410, and the portable device 400 determines that it is in such an area, it could prompt the user, via the micro-browser, for instance, to determine whether it should get merchant offers from merchants located near the user's current location 700. Additionally, the micro-browser could display the name of the user's current location to aid the user in making an informed decision.

If the user selects "NO," the portable device 400 could continue to monitor its location and next prompt the user to determine whether it should get merchant offers when it determines that it is in a different location defined in the correlation data 410. However, if the user selects "YES," the portable device 400 could send an information-request to the merchant-server 300 at the corresponding network address. Alternatively, the portable device could automatically request such information. In response to the user's "YES" selection, the portable device 400 could receive a list of merchants in the area 702 from the merchant server, each merchant being associated with a network address.

If the user selects one of the merchants on the list, the portable device 200 could request information from the network address corresponding to that merchant. In response to such a request, the merchant server 518 could send merchant information (i.e. a coupon) to the portable device 400 for the device's micro-browser for display 704. If the user then wishes to use the displayed coupon, the user could select "REDEEM" which could initiate redemption logic that could provide the merchant, via the merchant server 518, with information such as customer identity that is needed for the customer to redeem the coupon. Once the portable device 400 has provided the merchant server 518, and thus the merchant, with such information, the portable device 400 could display a confirmation of the redemption, along with possible instructions on how to have the coupon applied to the user's purchase 706. Other examples are possible as well.

3. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. A portable device comprising:
a network communication interface;
a processing unit;
data storage;
a display screen;
a user interface to input user-selections;
correlation-data stored in the data storage, wherein the correlation-data defines a plurality of latitude and longitude coordinate ranges, wherein each respective latitude and longitude coordinate range consists of two latitude coordinates and two longitude coordinates, wherein the correlation-data comprises a plurality of network addresses, wherein each respective latitude and longitude coordinate range is associated with a respective network address of the plurality of network addresses, and wherein each respective latitude and longitude coordinate range has been designated by a user of the portable device as a geographic location where the portable device requests information from a respective merchant server; and
request-trigger logic stored in the data storage, wherein the request-trigger logic is executable by the processing unit (i) to determine a current latitude and longitude of the portable device, (ii) to determine that the current latitude and longitude of the portable device are within a given latitude and longitude coordinate range defined by the correlation-data, and (iii) prior to the network communication interface receiving any information from a first merchant server after the processing unit determines that the current latitude and longitude of the portable device are within the given latitude and longitude coordinate range, to prompt a user of the portable device for permission to request redeemable merchant offers from the first merchant server via the network address corresponding to the given latitude and longitude coordinate range,
wherein the processing unit is operable to receive permission from the user to request the redeemable merchant offers and, in response to receipt of permission from the user, cause the network communication interface to send to the first merchant server, via the network address corresponding to the given latitude and longitude coordinate range, an information-request so as to request redeemable merchant offers from the first merchant server,
wherein the display screen is operable to display a list of a plurality of merchant identifiers received from the first merchant server,
wherein the user interface is operable to select a merchant identifier from the displayed list of the plurality of user-selectable merchant identifiers,
wherein selection of the merchant identifier from the displayed list of a plurality of user-selectable merchant identifiers received from the first merchant server causes the network communication interface to request merchant information from a second merchant server at a second network address, the second network address being associated with the merchant identifier selected from the displayed list of the plurality of user-selectable merchant identifiers, and
wherein the display screen is operable to display a redeemable merchant offer received from the second merchant server in response to the request for merchant information from the second merchant server.

2. The portable device of claim 1, wherein the information-request comprises a Hypertext Transfer Protocol (HTTP) request to the network address.

3. The portable device of claim 1, wherein the portable device is arranged to receive the information in response to the information-request and to display the information for viewing by a user.

4. The portable device of claim 1, wherein the network communication interface comprises a wireless communication interface arranged to communicate over an air interface with a base station.

5. The portable device of claim 1, wherein the portable device is a cellular telephone.

6. The portable device of claim 1, further comprising a position-determination module that is operable to determine the current latitude and longitude of the portable device.

7. The portable device of claim 6, wherein the position-determination module comprises a receiver that is operable to measure an arrival time of at least three concurrently received wireless signals transmitted from a constellation of GPS satellites.

8. The portable device of claim 6, wherein the position-determination module comprises logic to request from a wireless carrier an indication of the current latitude and longitude of the portable device.

9. The portable device of claim 1, further comprising:
wherein the display screen displays a message to prompt the user of the portable device for permission to request the information, and
wherein the display screen displays information received in response to the information-request sent to the network address.

10. The portable device of claim 1,
wherein the merchant information from the second merchant server defines a merchant-interface through which the user can interact with the second merchant server, and
wherein the merchant-interface defines: (i) a merchant coupon, and (ii) coupon-redemption logic for generating a coupon-redemption request and for sending to the second merchant server the coupon-redemption request and information identifying the user as a customer redeeming the merchant coupon.

11. The portable device of claim 10, wherein the information defines the merchant-interface in a markup-language, and the portable device includes an interpreter for interpreting the markup-language.

12. The portable device of claim 10, further comprising:
wherein after the coupon redemption request and information identifying the user is sent to the second merchant server, the display screen displays: (i) a confirmation of redemption of the merchant coupon, and (ii) instructions on how to apply the merchant coupon to a purchase made by the user.

13. The portable device of claim 1, further comprising:
wherein the correlation-data further defines a plurality of location names,
wherein each latitude and longitude coordinate range of the plurality of latitude and longitude coordinate ranges is further associated with a respective location name of the plurality of location names,
wherein a given latitude and longitude coordinate range of the plurality of latitude and longitude coordinate ranges is associated with a given location name of the plurality of location names, and
wherein the display screen is operable to display the given location name when the portable device enters a geographic location defined by the given latitude and longitude coordinate range.

14. The portable device of claim 1, wherein receipt of the request, for merchant information from the second server, by the second merchant server causes the second merchant server to generate and transmit, for delivery to a merchant's store, a notification indicating that the user is at a particular location.

15. An information-distribution system comprising:
a portable device having (i) a network communication interface arranged to provide connectivity with a network, (ii) a location-determination module that is operable to determine a geographic location of the portable device, (iii) a processing unit, (iv) data storage containing request trigger logic executable by the processing unit, and a set of correlation-data that defines geographic locations and, for each defined geographic location, a corresponding network address, wherein each geographic location defined by the correlation-data has been designated by a user of the portable device as a geographic location where the portable device requests information, (v) a display screen, and (vi) a user interface to input user-selections; and
a first merchant server that is accessible via a first network address that is defined by the set of correlation-data and that corresponds to a given geographic location defined by the correlation data,
wherein the processing unit executes the request-trigger logic to make a determination that the geographic location of the portable device matches the given geographic location defined by the correlation-data, and prior to the network communication interface receiving any information from the first merchant server after the processing unit determines that the geographic location of the portable device matches the given geographic location defined by the correlation-data, to prompt a user of the portable device for permission to request redeemable merchant offers from the first merchant server via the first network address,
wherein the portable device is operable to receive permission from the user to request redeemable merchant offers and, in response to receipt of the permission from the user, cause the network communication interface to send a first information-request to the first merchant server via the first network address,
wherein, in response to receiving the first information-request, the first merchant server generates and transmits, for delivery to a merchant's store, a notification indicating that the user is at the geographic location of the portable device,
wherein the first information-request comprises information about a user of the portable device, and
wherein, in response to the first information-request sent to the first merchant server, the first merchant server is operable to tailor merchant information based on information about the user of the portable device and to send the tailored merchant information to the portable device.

16. The information-distribution system of claim 15, wherein the portable device receives the merchant information and displays the merchant information for viewing by a user.

17. The information-distribution system of claim 15, wherein the network communication interface comprises a wireless communication interface adapted to communicate over an air interface with a radio access system that provides connectivity with the network.

18. The information-distribution system of claim 17, wherein the portable device is a cellular telephone.

19. The information-distribution system of claim 15, wherein the location-determination module includes a receiver that is operable to measure an arrival time of at least three concurrently received wireless signals transmitted from a constellation of GPS satellites.

20. The information-distribution system of claim 15, wherein the location-determination module includes logic to request from a wireless carrier an indication of the current latitude and longitude of the portable device.

21. The information-distribution system of claim 15, wherein the information about the user of the portable device comprises information selected from the group consisting of (i) information that identifies an age of the user, and (ii) information that identifies a sex of the user.

22. The information-distribution system of claim 15, further comprising:
a second merchant server that is accessible via a second network address,
wherein, in response to receiving the first information-request, the first merchant server also transmits to the portable device a list of a plurality of user-selectable merchant identifiers to be displayed via the display screen,
wherein the user interface is operable to select a merchant identifier from the displayed list of the plurality of user-selectable merchant identifiers,
wherein selection of the merchant identifier from the displayed list of a plurality of user-selectable merchant identifiers received from the first merchant server causes the network communication interface to request merchant information from the second merchant server at the second network address via a second information-request, the second network address being associated with the merchant identifier selected from the displayed list of the plurality of user-selectable merchant identifiers, and
wherein the display screen is operable to display a redeemable merchant offer received from the second merchant server in response to the second information-request.

23. The information-distribution system for claim 22, wherein the merchant information defines a merchant-interface through which a user of the portable device can interact with the merchant server, and
wherein the merchant-interface defines (i) a merchant coupon, and (ii) coupon-redemption logic for generating a coupon-redemption request and for sending to the second merchant server the coupon redemption request and information identifying the user as a customer redeeming the merchant coupon.

24. The information-distribution system of claim 23, wherein the merchant information defines the merchant-interface in a markup-language, and the portable device includes an interpreter for interpreting the markup-language.

25. The information-distribution system of claim 24, wherein the markup-language comprises a Hypertext Markup Language (HTML).

26. The information-distribution system of claim 24, wherein the markup-language comprises a Handheld Device Markup Language (HDML).

27. The information distribution system of claim 22, wherein after the coupon redemption request and information identifying the user is sent to the second merchant server, the display screen displays: (i) a confirmation of redemption of the merchant coupon, and (ii) instructions on how to apply the merchant coupon to a purchase made by the user.

28. A method of distributing merchant information to a portable device, the method comprising:

the portable device maintaining correlation-data that defines a plurality of latitude and longitude coordinate ranges, wherein each respective latitude and longitude coordinate range consists of two latitude coordinates and two longitude coordinates, wherein the correlation-data comprises a plurality of network addresses, wherein each respective latitude and longitude coordinate range is associated with a respective network address of the plurality of network addresses, and wherein each respective latitude and longitude coordinate range has been designated by a user of the portable device as a geographic location where the portable device requests information from a respective merchant server;

the portable device monitoring a current latitude and longitude of the portable device;

the portable device determining that the current latitude and longitude of the portable device are within a given latitude and longitude coordinate range defined by the correlation-data;

prior to the portable device receiving information from a first given merchant server after the portable device determining that the current latitude and longitude of the portable device are within the given latitude and longitude coordinate range, prompting a user of the portable device for permission to send an information-request to the first given merchant server via the network address associated with the given latitude and longitude coordinate range, the portable device sending an information request to the first given merchant server via the network address associated with the given latitude and longitude coordinate range, wherein sending the information-request occurs in response to the portable device receiving permission from the user to send the information-request; and the portable device displaying a list of a plurality of merchant identifiers received from the first merchant server, the portable device receiving a selection of a merchant identifier from the displayed list of the plurality of user-selectable merchant identifiers and the portable device responsively requesting merchant information from a second merchant server at a second network address via a second information-request, the second network address being associated with the merchant identifier selected from the displayed list of the plurality of user-selectable merchant identifiers, and the portable device receiving merchant-information in response to the second information-request.

29. The method of claim 28, further comprising:

wherein the merchant-information comprises a merchant-interface, and wherein the merchant-interface defines a merchant coupon and coupon-redemption logic;

the portable device displaying the merchant coupon for viewing by the user; and invoking the coupon redemption logic so as to generate a coupon-redemption request and to send to the second merchant server the coupon-redemption request and information identifying the user as a customer redeeming the merchant coupon.

30. The method of claim 29, wherein the merchant-interface defines a merchant-interface which a user of the portable device can interact with the second merchant server.

31. The method of claim 29, further comprising:

after invoking the coupon redemption logic so as to generate a coupon-redemption request and to send to the second merchant server the coupon-redemption request and information identifying the user, displaying a confirmation of the redemption of the merchant coupon and instructions on how to apply the merchant coupon to a purchase made by the user.

32. The method of claim 28, further comprising:

in response to receiving the second information-request, the second merchant server generating and transmitting, for delivery to a merchant's store, a notification indicating that the user is at a particular location.

* * * * *